(12) United States Patent
Adam et al.

(10) Patent No.: US 9,151,434 B2
(45) Date of Patent: Oct. 6, 2015

(54) COAL ROPE DISTRIBUTOR WITH REPLACEABLE WEAR COMPONENTS

(75) Inventors: Daniel J. Adam, East Canaan, CT (US); Oliver G. Briggs, Jr., Jefferson, MA (US); Thomas J. Campanelli, Berlin, CT (US); Paul M. Colson, Southwick, MA (US); Christopher D. Curl, Branford, CT (US); Dai Q. Dau, Hartford, CT (US); Wendell H. Mills, Granby, CT (US)

(73) Assignee: ALSTOM Technology Ltd, Baden (CH)

( * ) Notice: Subject to any disclaimer, the term of this patent is extended or adjusted under 35 U.S.C. 154(b) by 916 days.

(21) Appl. No.: 12/610,671

(22) Filed: Nov. 2, 2009

(65) Prior Publication Data
US 2010/0154689 A1    Jun. 24, 2010

Related U.S. Application Data

(63) Continuation-in-part of application No. 12/504,932, filed on Jul. 17, 2009.

(60) Provisional application No. 61/138,578, filed on Dec. 18, 2008.

(51) Int. Cl.
*F16L 57/06* (2006.01)
*F23K 3/02* (2006.01)
(Continued)

(52) U.S. Cl.
CPC ............ *F16L 57/06* (2013.01); *F23C 7/008* (2013.01); *F16L 43/002* (2013.01); *F23C 5/06* (2013.01);
(Continued)

(58) Field of Classification Search
CPC ... F23D 1/00; F23D 2201/20; F23D 2201/30; F23K 3/02; F23K 2203/008; F23K 2203/10; F23K 2203/101; F23K 2203/201

USPC ....... 285/179; 403/205; 110/104 B, 263, 260, 110/261, 264, 265
See application file for complete search history.

(56) References Cited

U.S. PATENT DOCUMENTS 4,027,605 A * 6/1977 Legille ...................... 110/182.5
4,130,300 A * 12/1978 Sheridan ........................ 285/16
(Continued)

FOREIGN PATENT DOCUMENTS

CN         2051324 U    1/1990
CN       101135444      3/2008
(Continued)

OTHER PUBLICATIONS

Office Action of the Intellectual Property Office of Taiwan dated Nov. 11, 2012.
(Continued)

*Primary Examiner* — David J Laux
(74) *Attorney, Agent, or Firm* — Robert D. Crawford

(57) ABSTRACT

A head assembly 52, 152 for a pulverized coal nozzle includes removeable wear-resistant inserts having vanes 54, 151, 153. The vanes 54, 151, 153 may be flat or curved to direct a stream of air and pulverized solid fuel particles from the inlet port 60, 160 toward the outlet port 62, 162. The curved vanes 151, 153 curve in two dimensions to evenly distribute the stream of air and pulverized solid fuel away from the outer surfaces reducing wear and corrosion. The pipe elbow has a removable cover 70, 170 that allows for easy access. The vanes are attached to a wear-resistant replaceable liner 185 thus allowing them to be easily removed and replaced. The wear-resistant liner 185 may be made from several parts 187, 189 for ease of removal and replacement.

16 Claims, 13 Drawing Sheets

(51) Int. Cl.
  *F23C 7/00* (2006.01)
  *F16L 43/00* (2006.01)
  *F23C 5/06* (2006.01)
  *F23D 1/00* (2006.01)

(52) U.S. Cl.
  CPC .............. *F23D 1/00* (2013.01); *F23D 2201/20* (2013.01); *F23D 2201/30* (2013.01); *F23K 3/02* (2013.01); *F23K 2203/101* (2013.01)

(56) References Cited

U.S. PATENT DOCUMENTS

| | | | |
|---|---|---|---|
| 4,633,913 A * | 1/1987 | Carty et al. | 138/147 |
| 4,654,001 A | 3/1987 | LaRue | |
| 4,684,155 A * | 8/1987 | Davis | 285/16 |
| 5,526,758 A | 6/1996 | Giammaruti et al. | |
| 5,588,380 A | 12/1996 | LaRose | |
| 5,623,884 A * | 4/1997 | Penterson et al. | 110/264 |
| 6,053,118 A | 4/2000 | Okamoto et al. | |
| 6,058,855 A | 5/2000 | Ake et al. | |
| 6,105,516 A | 8/2000 | Bowen | |
| 6,409,790 B1 | 6/2002 | Calderon et al. | |
| 2003/0209470 A1 | 11/2003 | Wark | |
| 2009/0038518 A1* | 2/2009 | Liu et al. | 110/263 |
| 2010/0123027 A1* | 5/2010 | Larue et al. | 110/263 |

FOREIGN PATENT DOCUMENTS

| | | |
|---|---|---|
| DE | 573 335 | 3/1933 |
| DE | 103 60 839 B3 | 6/2005 |
| FR | 748661 A | 7/1933 |
| JP | S58164910 A | 9/1983 |
| JP | S58224207 A | 12/1983 |
| JP | 74409/89 | 5/1989 |
| JP | H01314803 A | 12/1989 |
| JP | H0250011 A | 2/1990 |
| JP | 2-100034 | 8/1990 |
| JP | S58110908 A | 7/1993 |
| JP | 9 133345 | 5/1997 |
| JP | H1019207 A | 1/1998 |
| JP | H11292283 A | 10/1999 |
| JP | 2000320807 A | 11/2000 |
| JP | 2009 162441 | 7/2009 |

OTHER PUBLICATIONS

Notice of Reasons for Rejection from the Japanese Intellectual Property Office mailed Jun. 11, 2013 for JP2011-542187.

Chinese Chinese Second Office Action & Search Report dated Jun. 18, 2014, CN Appln. No. 200980157306.5.

Japanese Office Action issued Dec. 8, 2014 for JP Appln. No. 2014-20213.

Mexican Office Action issued Nov. 28, 2014 for MX Appln. No. MX/a/2011/006410.

PCT International Search Report and the Written Opinion of the International Searching Authority dated Nov. 20, 2009—(PCT/US2009/065273).

First Examination report issued by the Australian Patent Office dated May 5, 2015 for Australian Patent Appln. No. 2009336102.

* cited by examiner

COAL ROPE DISTRIBUTOR WITH REPLACEABLE WEAR COMPONENTS

CROSS REFERENCE TO RELATED APPLICATIONS

This application claiming priority from and the benefit and earlier filing date of U.S. Provisional Patent Application No. 61/138,578, filed Dec. 18, 2008, entitled "PULVERIZED FUEL HEAD ASSEMBLY WITH COAL ROPE DISTRIBUTOR", and U.S. Non-Provisional patent application Ser. No. 12/504,932, filed Jul. 17, 2009, entitled "COAL ROPE DISTRIBUTOR WITH REPLACEABLE WEAR COMPONENTS". These patent applications are hereby incorporated by references as if set forth in their entirety herein.

BACKGROUND

The present invention relates to pulverized solid fuel (pulverized coal) delivery systems and, more particularly, to a fuel head assembly for use in a pulverized coal delivery system.

FIG. 1 depicts an example of a pulverized solid fuel-fired steam generator 10, which is shown to include a combustion chamber 14 within which the combustion of pulverized solid fuel (e.g., pulverized coal) and air is initiated. Hot gases that are produced from combustion of the pulverized coal and air rise upwardly in the steam generator 10 and give up heat to fluid passing through tubes (not shown) that in conventional fashion line the walls of the steam generator 10. The steam generated in the steam generator 10 may be made to flow to a turbine (not shown), such as used in a turbine/generator set (not shown), or for any other purpose.

The steam generator 10 may include one or more windboxes 20, which may be positioned in the corners or the sides of the steam generator 10. Each windbox 20 is provided with a plurality of air compartments 15 through which air supplied from a suitable source (e.g., a fan) is injected into the combustion chamber 14 of the steam generator 10. Also disposed in each windbox 20 is a plurality of fuel compartments 12, through which pulverized coal is injected into the combustion chamber 14 of the steam generator 10.

The pulverized coal is supplied to the fuel compartments 12 by a pulverized coal supply means 22, which includes a pulverizer 24 in fluid communication with the fuel compartments 12 via a plurality of pulverized solid fuel ducts 26. The pulverizer 24 is operatively connected to an air source (e.g., a fan), whereby the air stream generated by the air source transports the pulverized coal from the pulverizer 24, through the solid fuel ducts 26, through the fuel compartments 12, and into the combustion chamber 14.

FIG. 2 depicts a cross-sectional, elevation view of a conventional pulverized coal nozzle assembly 34 disposed within a fuel compartment 12. While only one fuel compartment 12 is shown, it will be appreciated that each fuel compartment 12 of FIG. 1 may include a nozzle assembly 34. The nozzle assembly 34 includes a nozzle tip 36, which protrudes into the combustion chamber 14, a fuel feed pipe 38, which extends through the fuel compartment 12 and a head assembly 40 by which the nozzle assembly 38 is coupled to the solid fuel duct 26. Typically, the head assembly 40 comprises an elbow that connects the substantially vertical solid fuel duct 26 with the substantially horizontal fuel feed pipe 38.

The nozzle tip 36 may have a double shell configuration, comprising an outer shell 39 and an inner shell 42. The inner shell 42 is coaxially disposed within the outer shell 39 to provide an annular space 44 between the inner and outer shells 42, 39. The inner shell 42 is connected to the fuel feed pipe 38 for feeding a stream of pulverized coal entrained in air through the fuel feed pipe 38 and the inner shell 42 into the combustion chamber 14 (FIG. 1). The annular space 44 feeds a stream of secondary air into the combustion chamber 14, which helps to cool the nozzle tip 36. While the nozzle tip 36 is shown as being separate and pivotable relative to the fuel feed pipe 38, it will be appreciated that the end of the fuel feed pipe 38 may instead be shaped to form a stationary nozzle tip.

Historically, pulverized coal boiler systems have had difficulty achieving uniform distribution of pulverized coal and transport air across the fuel duct 26 and nozzle assembly 34. Maldistribution is associated with the transport in a two phase flow system of a pulverized solid (e.g., coal) and gas (e.g., air). At each turn in the fuel duct 26, separation between the phases occurs. Finally, when the piping transitions from the vertical fuel duct 26 to horizontal nozzle assembly 34, a narrow, concentrated stream of coal, known as a "coal rope", has been established in certain portions of the cross section of the fuel feed pipe 38.

Each nozzle assembly 34 will have a different coal rope concentration and location depending on the upstream routing of the fuel duct 26 and other factors such as air and coal flow rates. This coal roping promotes localized erosion that accelerates wear and reduces component life. Coal roping also decreases the fuel/air mixing efficiency and, thus, decreases the efficiency of fuel combustion.

The coal ropes cause erosion where they contact the walls. They follow the airflow currents. In FIG. 2, the currents may cause the ropes to erode the walls of the fuel feed pipe 38. The fuel feed pipes 38 are located inside of the fuel compartments 12. These typically pass through the windbox. Therefore, it is very difficult to replace parts within the fuel feed pipe 38.

Other parts, such as the head assembly 40 are exposed and easier to access and maintain.

In the past, improving pulverized coal distribution through the horizontal nozzle assembly 34 was done with a device known as a coal rope breaker, which are typically mechanical devices disposed in the fuel feed pipe 38. For example, U.S. Pat. No. 6,105,516 describes multiple, transversely extending rib segments protruding into the fuel feed pipe portion of the nozzle, U.S. Pat. No. 5,526,758 describes a distribution half-cone mounted within a burner nozzle, and U.S. Pat. No. 5,588,380 describes a conical diffuser with angled support legs disposed along the coal nozzle axis. Another known method for breaking up coal ropes includes placing an orifice within the fuel feed pipe 38.

Experience and computer modeling has indicated that these coal rope breaking devices have had some success in redistributing the air, but little impact on the pulverized coal distribution within the nozzle. Furthermore, these coal rope-breaking devices add unwanted pressure drop to the pulverized coal delivery system. This pressure drop could have the potential of reducing or limiting the pulverizer system delivery capacity.

Thus, there is a need for a device that is easy to service and maintain that improves pulverized coal distribution through the burner nozzle assembly to eliminate or reduce the formation of coal ropes and the problems associated with coal ropes, while reducing the amount of unwanted pressure drop in the pulverized coal delivery system.

BRIEF SUMMARY

The above-described and other drawbacks and deficiencies of the prior art are overcome or alleviated by a head assembly for a pulverized coal nozzle including at least one turning vane and at least one coal rope-breaking vane disposed within a pipe elbow. The turning vane is angled relative to the inlet port and the outlet port of the pipe elbow to redirect a stream of air and pulverized coal particles from the inlet port toward the outlet port. The coal rope-breaking vane is pivotable about an axis to adjust an angle of the coal rope-breaking vane relative to a stream of air and pulverized coal particles from the inlet port. A portion of the coal rope-breaking vane may extend through the pipe elbow to allow the coal rope-breaking vane to be adjusted while the pulverized coal particles flow through the head assembly. The turning vanes may also be adjustable.

In various embodiments, the pipe elbow further includes a removable cover an inspection port, and a removable cover. The at least one coal rope breaking vane and at least one turning vane may be attached to the removable cover, thus allowing the at least one turning vane and at least one coal rope breaking vane to be removed with the removable cover.

BRIEF DESCRIPTION OF THE DRAWINGS

Referring now to the drawings wherein like items are numbered alike in the various Figures.

DETAILED DESCRIPTION

Figure 3:
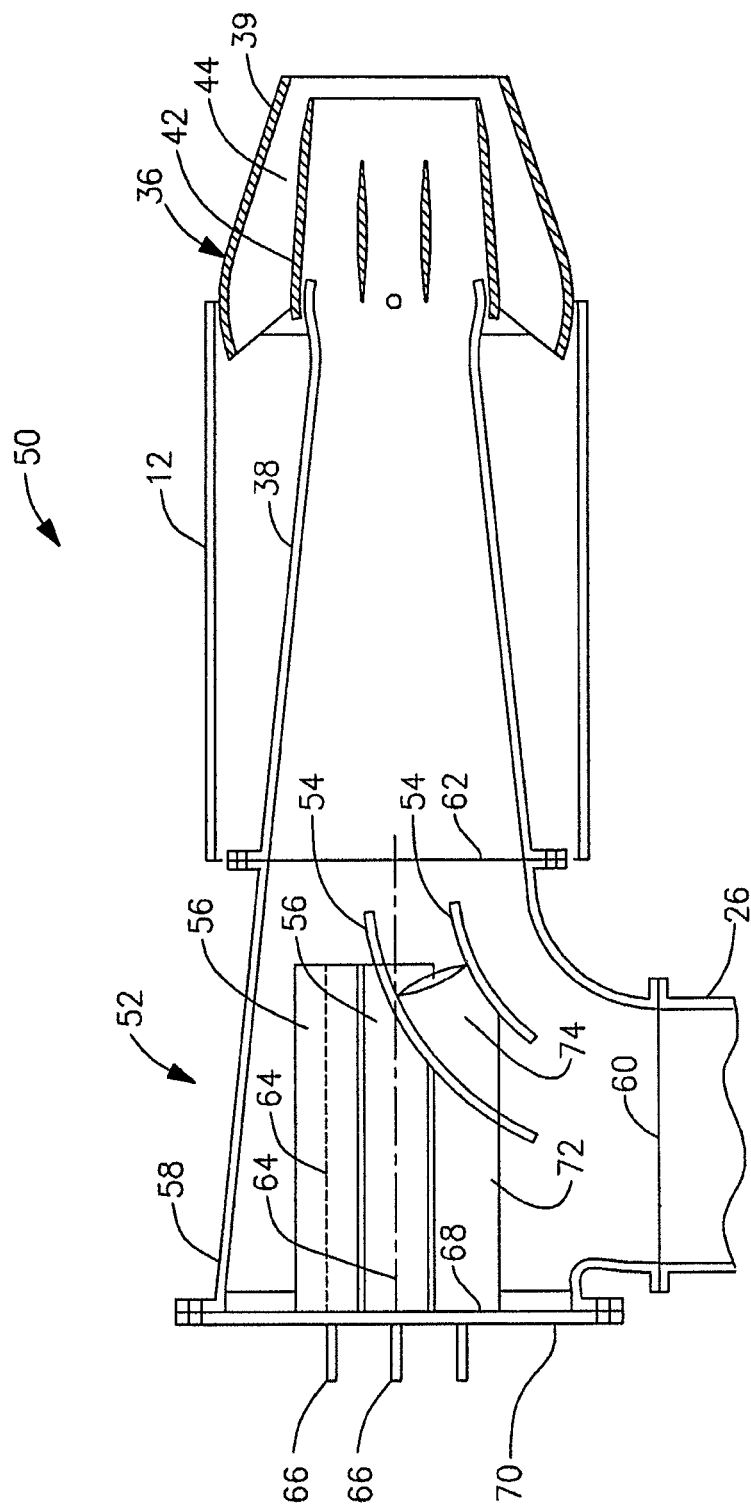
FIG. 3 is a cross-sectional, elevational view of a pulverized coal nozzle assembly including a fuel head assembly in accordance with an embodiment of the present invention.
Figure 4:
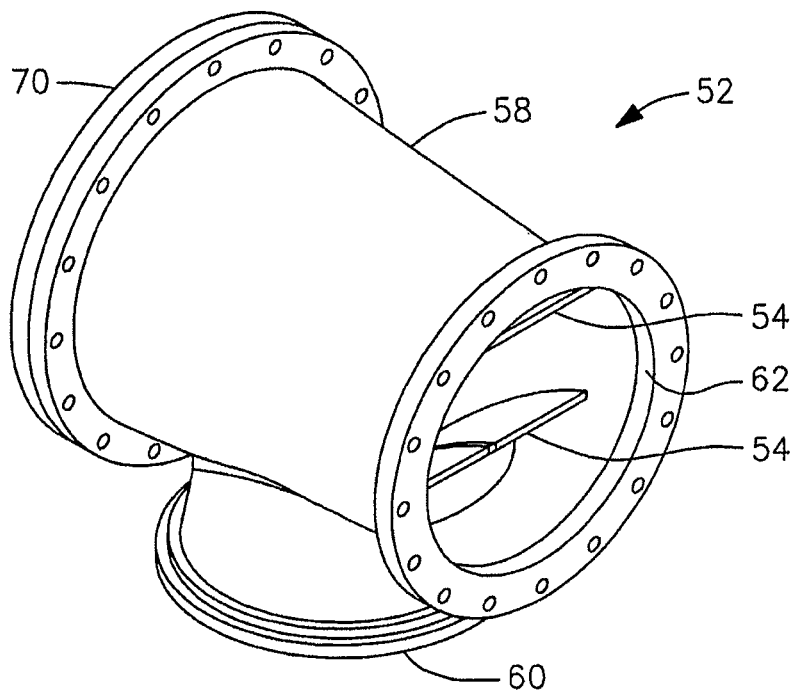
FIG. 4 is a perspective view of the fuel head assembly of FIG. 3.

FIG. 3 depicts a cross-sectional, elevation view of a pulverized coal nozzle assembly 50 disposed within a fuel compartment 12. While only one fuel compartment 12 is shown, it will be appreciated that each fuel compartment 12 of FIG. 1 may include a nozzle assembly 50. The nozzle assembly 50 includes a nozzle tip 36, which may protrude into the combustion chamber 14, a fuel feed pipe 38, which extends through the fuel compartment 12 and a head assembly 52 by which the nozzle assembly 50 is coupled to a solid fuel duct 26.

Figure 2:
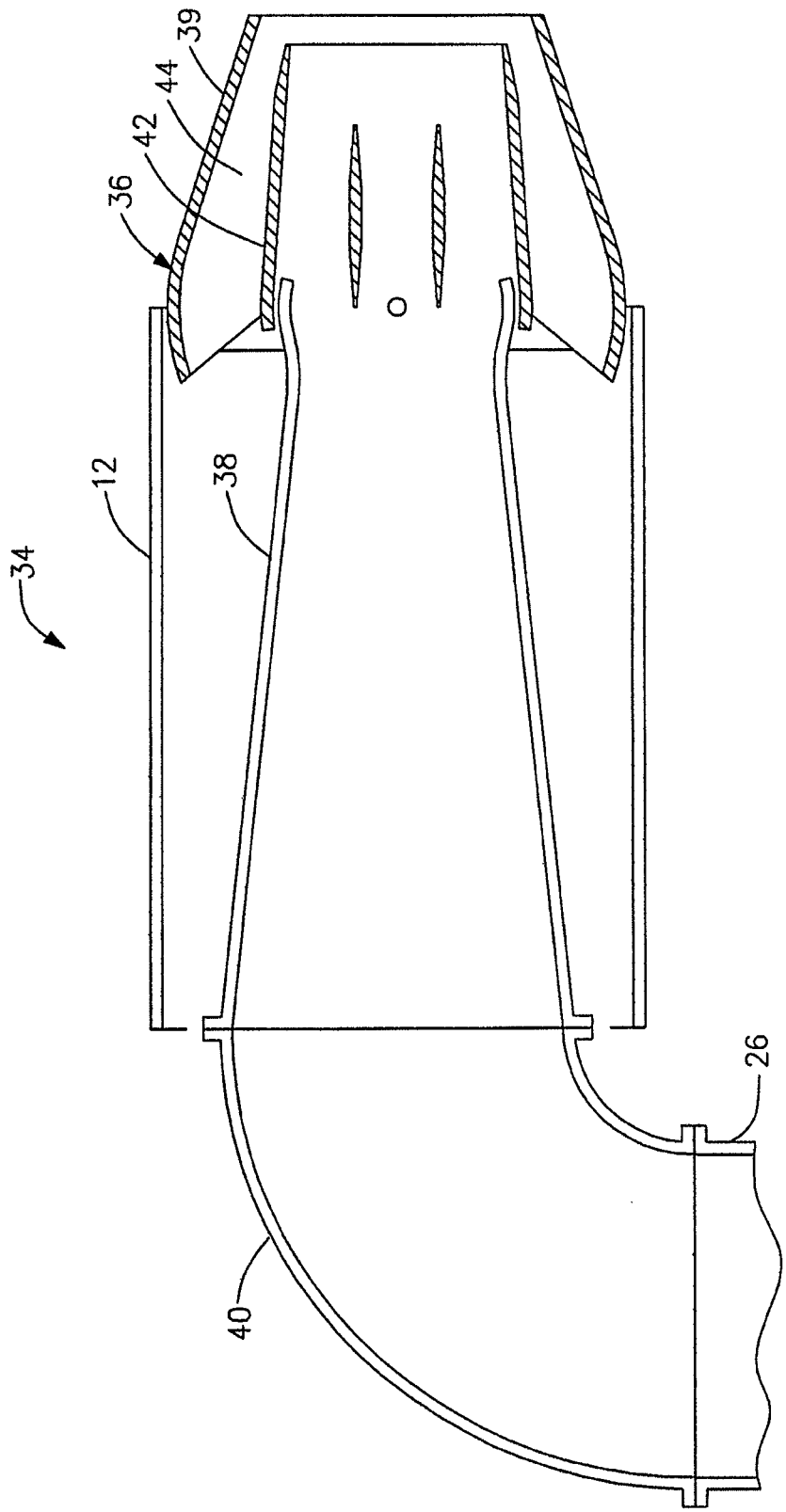
FIG. 2 is a cross-sectional, elevation view of a prior art pulverized coal nozzle assembly disposed within a fuel compartment.
Figure 5:
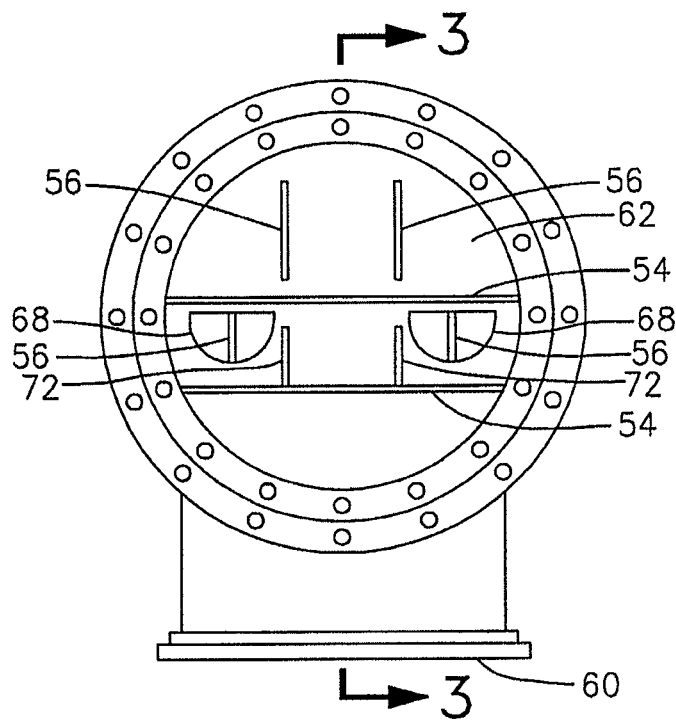
FIG. 5 is an elevation view of the fuel head assembly of FIG. 3 depicting the outlet end.
Figure 6:
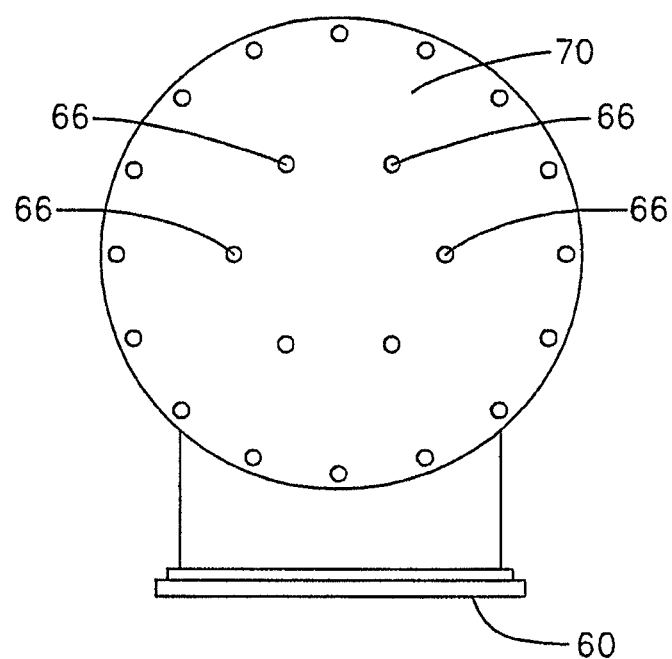
FIG. 6 is an elevation view of the fuel head assembly of FIG. 3 depicting the access port cover.

Referring to FIGS. 3 through 6, the head assembly 52 for a pulverized solid fuel nozzle 50 includes at least one turning vane 54 and at least one coal rope breaking vane 56 disposed within a pipe elbow 58. The embodiment shown includes two turning vanes 54 and four coal rope-breaking vanes 56. The pipe elbow 58 may include, for example, a ninety degree mitered elbow that can be fit into an existing system in place of a standard elbow (e.g. head assembly 40 of FIG. 2). Each turning vane 54 is angled relative to an inlet port 60 and an outlet port 62 of the pipe elbow 58 to redirect a stream of air and pulverized coal particles from the inlet port 60 toward the outlet port 62, which helps to promote flow and reduce pressure drop. In the example shown, the turning vanes 54 are bent to form a radius, and extends substantially across the entire flow area of the pipe elbow 58. Each turning vane 54 may severed, as indicated at 59, to allow the left and right sides of the turning vanes, as shown in FIG. 5, to be independently adjusted, as will be discussed in further detail hereinafter. The turning vanes 54 may be made from abrasion resistant metals or ceramics.

Each coal rope-breaking vane 56 is pivotable about an axis 64 to adjust an angle of the coal rope-breaking vane 56 relative to a stream of air and pulverized coal particles from the inlet port 60. A portion 66 of the coal rope-breaking vane 56 may extend through the pipe elbow 58 to allow the coal rope-breaking vane 56 to be adjusted while the pulverized coal particles flow through the head assembly 52. This allows for easy, on-line adjustment of the coal rope breaking vanes 56 to account for differences in coal rope concentration and location among the nozzle assemblies 50 in a boiler. Depending on the length of the coal rope breaking vanes 56, the turning vanes 54 may include inspection ports 68 (FIG. 5) through which the coal rope breaking vanes 56 extend. The coal rope breaking vanes 56 may be made from abrasion resistant metals or ceramics.

The pipe elbow 58 may further include an inspection ports 68 and a removable cover 70. The coal rope breaking vanes 56 and turning vanes 54 may be attached to the removable cover 70, thus allowing them to be easily removed by simply removing the cover 70. Access to the windbox or furnace is not required. Once removed, the cover 70, and vanes 54, 56 can be shipped as an assembly for off-site repair and refurbishment. Replacing burner head 52 components extends the wear life of larger stationary nozzles and tips.

In the embodiment shown, each turning vane 54 is secured to support bars 72, which is in turn are secured to the access cover 70. One or more spacers 74 may be secured between the turning vanes 54 for added structural stability. The support bars 72 may include a portion (e.g., a pin) 76 that extends through the removable cover 70 to secure the support bars 72 to the cover 70 and allow the turning vanes 54 to be adjusted without removing the cover 70. Each support bar 76 is pivotable about an axis 78 to adjust an angle of the turning vanes 54 secured to the support bar 76 relative to a stream of air and pulverized coal particles from the inlet port 60. The support bars 72 may be secured in place by lock nuts or the like, which can be threaded on the external portions 76.

The coal rope breaking vanes 56 may include a portion (e.g., pin) 66 that extends through the removable cover 70 to secure the coal rope breaking vanes 56 to the cover 70 and to allow the coal rope breaking vanes 56 to be adjusted without removing the cover 70. The coal rope breaking vanes 56 may be secured in place by lock nuts or the like, which can be threaded on the external portion 66. In the embodiment shown, the coal rope breaking vanes 56 and turning vanes 54 are not secured to the pipe elbow 58 other than by the cover 70, thus allowing them to be removed from the pipe elbow 58 with the cover 70.

Figure 1:
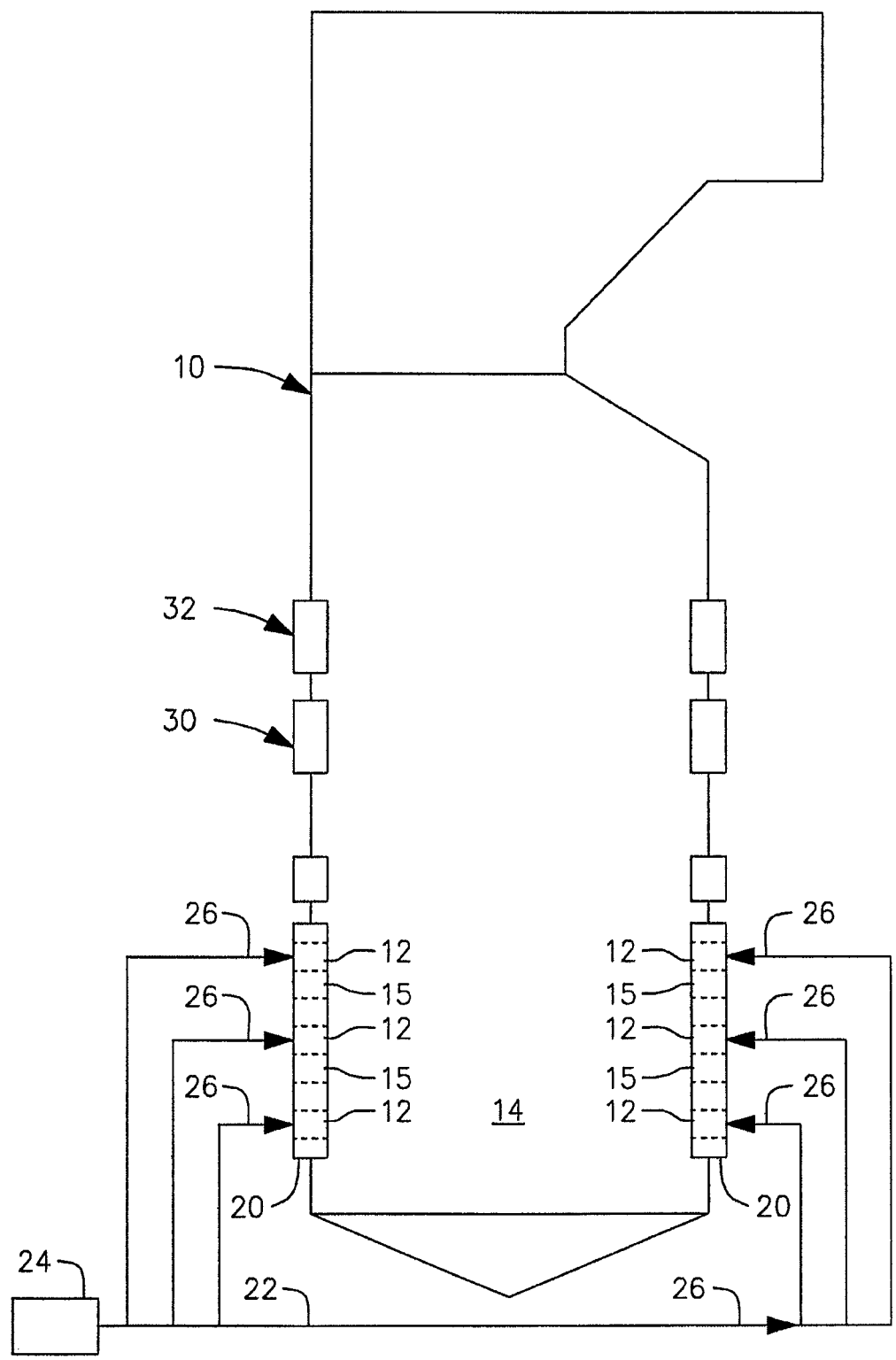
FIG. 1 is a schematic depiction of a prior art coal-fired steam generator including a plurality of windboxes having fuel compartments disposed therein.

Computer modeling has shown that the fuel head assembly 52 of the present invention improves coal distribution within the nozzle assembly 50, while maintaining substantially the same pressure loss as in a standard, long-radius pipe elbow (e.g., head 40 in FIG. 1). While not wanting to be bound by theory, it is believed that the improvement in coal distribution within the nozzle assembly 50 is partly due to the ability of the coal rope breaking vanes 56 to be positioned, and thus tailored, to the coal roping conditions within a particular nozzle assembly 50. Furthermore, it is believed that the improvement in coal distribution within the nozzle 50 is partly due to the location of coal rope breaking vanes 56, which are upstream of the fuel feed pipe 38, where prior art coal rope breaking devices are typically located. By placing the coal rope breaking vanes 56 in the fuel head assembly 52, the effective length available to allow coal particles to evenly distribute in the nozzle assembly 50 is increased.

Thus, when compared to the prior art coal rope breaking devices, the head assembly 52 of the present invention provides improved pulverized coal distribution through the horizontal burner nozzle assembly 50 to eliminate or reduce the formation of coal ropes and the problems associated with coal ropes, while reducing the amount of unwanted pressure drop.

The nozzle tip 36 may have a double shell configuration, comprising an outer shell 39 and an inner shell 42. The inner shell 42 is coaxially disposed within the outer shell 39 to provide an annular space 44 between the inner and outer shells 42, 39. The inner shell 42 is connected to the fuel feed pipe 38 for feeding a stream of pulverized coal entrained in air through the fuel feed pipe 38 and the inner shell 42 into the combustion chamber 14 (FIG. 1). The annular space 44 feeds a stream of secondary air into the combustion chamber 14, which helps to cool the nozzle tip 36. While the nozzle tip 36 is shown as being separate and pivotable relative to the fuel feed pipe 38, it will be appreciated that the end of the fuel feed pipe 38 may instead be shaped to form a stationary nozzle tip.

Figure 7:
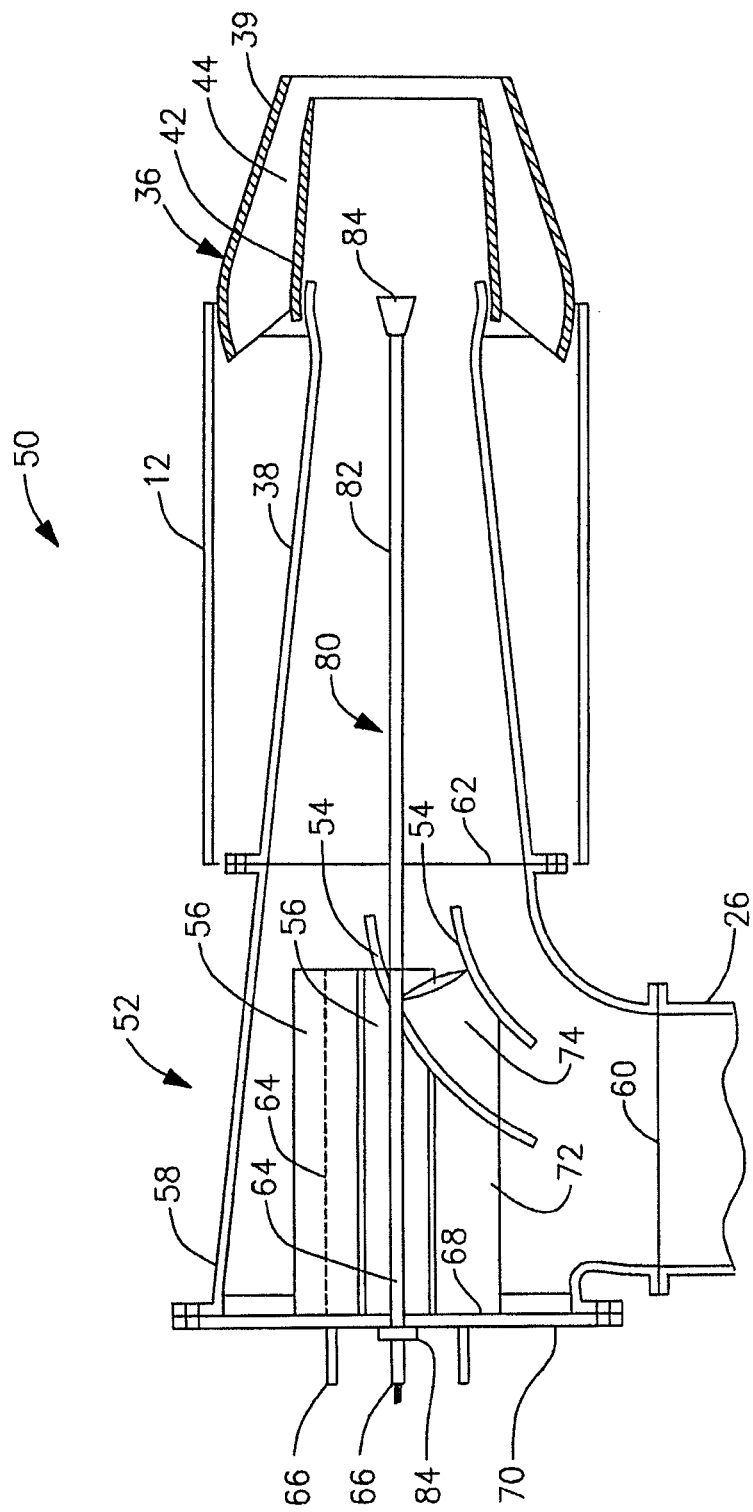
FIG. 7 is a cross-sectional, elevation view of a pulverized coal nozzle assembly in accordance with another embodiment of the present invention.

FIG. 7 depicts an embodiment of the burner nozzle assembly 50 with cylindrical geometry according to the present invention that includes a means 80 for adjusting a flame associated with the nozzle assembly 50. The adjusting means 80 allows for on-line flame shape control and provides the advantage of tailoring the flame front to maximize the reduction in boiler emissions, like NOx and CO. The adjusting means 80 includes a rod 82 extending along the central axis of the nozzle assembly 50, and a bluff body 84 (a body having a shape that produces resistance when immersed in a moving fluid) disposed at a free end of the rod 82 and positioned within the nozzle tip 36. The opposite end of the rod 82 extends through a gland seal 84 disposed through the removable cover 70. The gland seal 84 prevents the stream of pulverized coal entrained in air from escaping along the rod 82, while at the same time allowing the rod 82 to move in a direction along its axis. The rod 82 may be supported within the fuel feed pipe 38 by a pair of legs (not shown), which are fixed to the rod 82 and rest on an inner surface of the fuel feed pipe 38. Movement of the rod 82 and bluff body 84 in a direction along its axis allows the shape of the flame to be adjusted.

While FIG. 7 depicts the use of a bluff body 84, it is contemplated that other structures may be employed by the adjusting means. For example, a swirler (a body having fins spaced about its perimeter) may be used to impart rotation on the flow of pulverized coal entrained in air.

Figure 8:
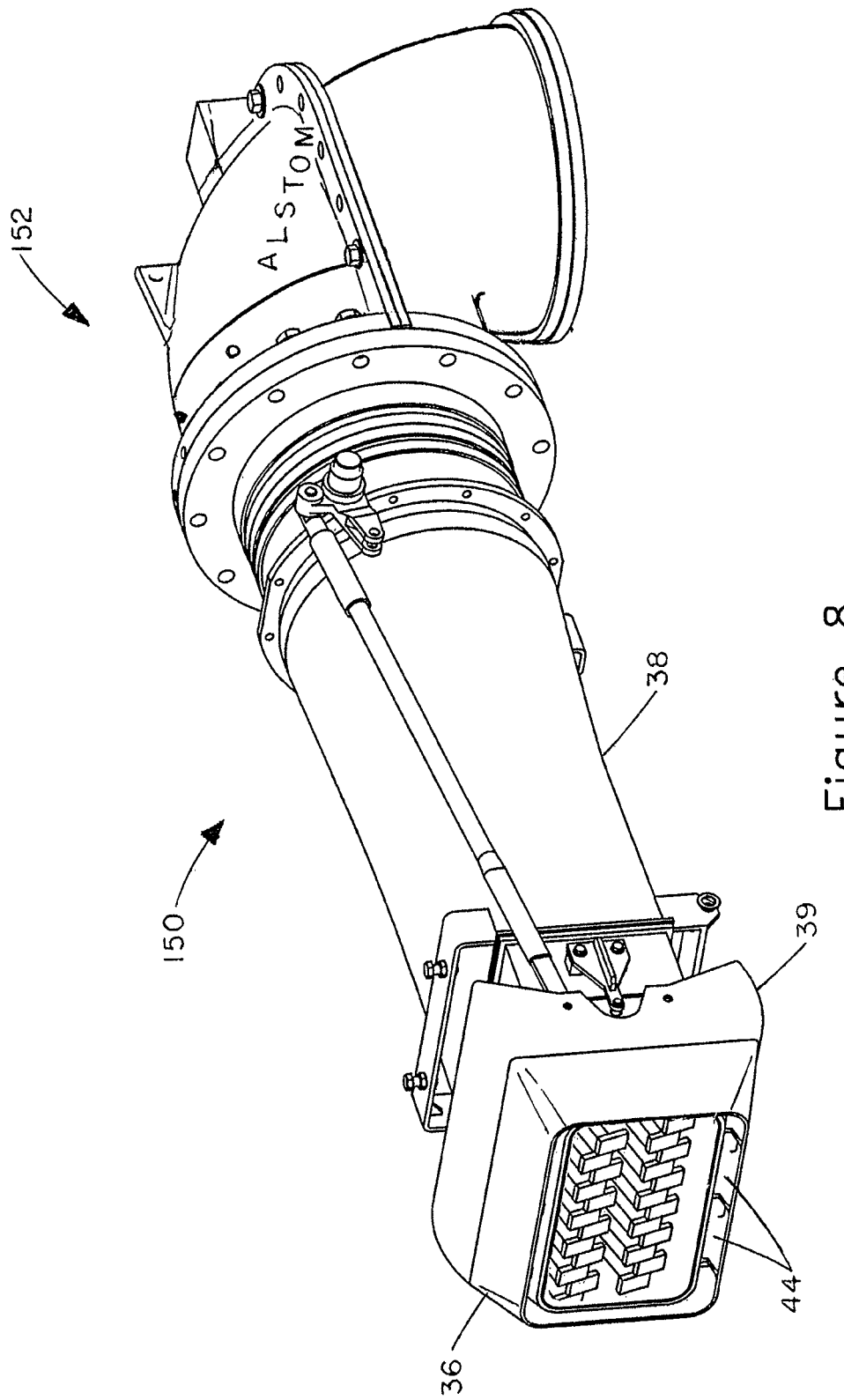
FIG. 8 is a perspective view of a another embodiment of a pulverized coal nozzle assembly according to the present invention.

FIG. 8 is a perspective view of another embodiment of a pulverized coal nozzle assembly according to the present invention. This embodiment includes a nozzle assembly 50 and a head assembly 152. The nozzle assembly 50 has a fuel feed pipe 38, which extends through a fuel compartment 12. Each fuel compartment of FIG. 1 may contain a nozzle assembly 50.

As in the previous embodiment, the nozzle assembly 50 includes a nozzle tip 36 at one end of the fuel feed pipe 38 which may protrude into a combustion chamber 14. The other end of the fuel feed pipe 38 is connected to the head assembly 152.

Figure 9:
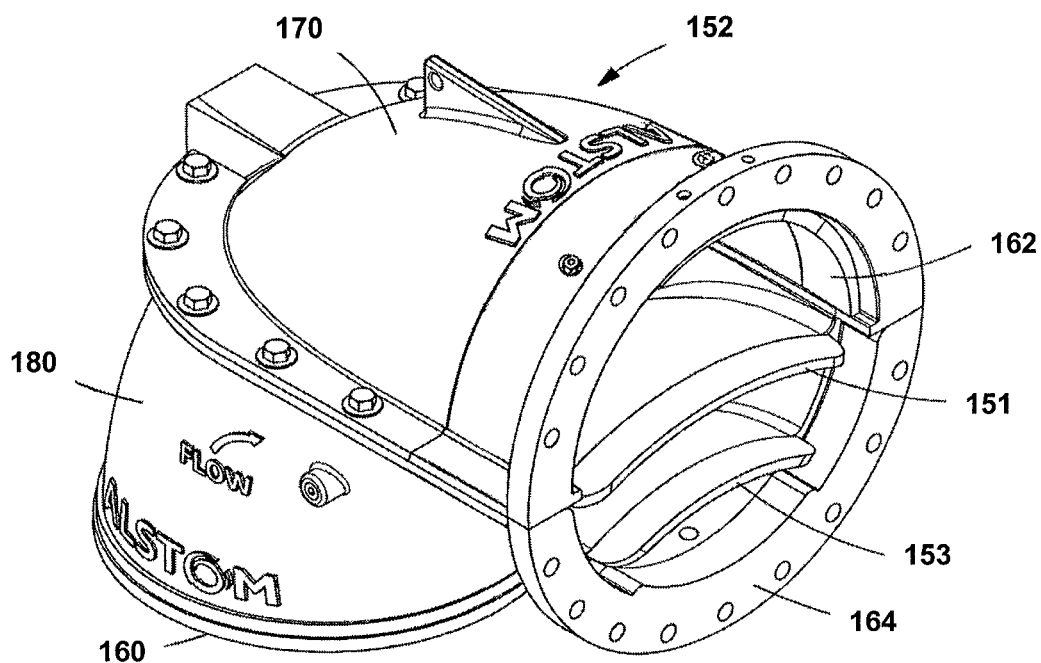
FIG. 9 shows a perspective view of the fuel head assembly of FIG. 8.

FIG. 9 shows a perspective view of the fuel head assembly 152 of FIG. 8. The head assembly 152 has an inlet port 160, and an outlet port 162. Both of these have flanges to attach to other parts. Outlet port flange 164 is shown here which attaches the head assembly 152 to the fuel feed pipe 38.

A removable cover 170 and lower casing 180 connect to each other to create an internal cavity 183 being a curved tubular conduit fluidically coupling the inlet port 160 to the outlet port 162 generally having a radius of curvature R.

A wear-resistant removable and replaceable casing liner 185 is disposed within the internal cavity 183. It has a plurality of curved vanes 151,153 (two are shown in this embodiment, however any number may be used).

The curved vane 151 have a surface that curves in a lengthwise direction CL moving from a leading edge 155 near the inlet port 160 to a trailing edge 156 near the outlet port 162. The radius of curvature of the curved vanes 151, 153 is approximately equal to the radius of curvature R of the internal cavity 183.

The surface also curved in a sideways direction, CS. The sideways curvature Cs of the curved vane has a radius of curvature approximately equal to a cross-sectional circumference, C, of the internal cavity 183.

In an alternative embodiment of the present invention, the trailing edge 156 of at least one of the curved vanes 151, 153 is angled away from its nearest conduit surface. This angle is preferably up to 13 degrees. This further reduces the air stream with entrained pulverized coal from contacting surfaces of the head assembly 152 and/or the nozzle assembly 150.

Also, in another alternative embodiment of the present invention, the leading edge 155 is substantially parallel to its nearest surface enclosing the internal cavity 183. This reduces air resistance and pressure drop.

This curvature in two dimensions is effective at directing the stream of air and pulverized coal particles from the inlet port 160 toward the outlet port 162 away from any surfaces around the internal cavity 183 and the fuel nozzle. This greatly reduces wear and corrosion of the coal nozzle and reduces required maintenance.

Two curved vanes 151, 153 are partially shown here. These function to guide the air/fuel particles through the head assembly 152 but also function to break up coal ropes. These generally direct the fuel particles entrained in air flow around from the inlet port 160 to the outlet port 162 reducing collection of a coal ropes typically having the largest possible radius of curvature that typically runs along the inside surface of the head assembly 152. These direct a portion of the flow underneath each of the curved vanes 151, 153 instead of on the inner surface of the head assembly 152.

In the preferred embodiment, the curved vanes 151, 153 are fixed and do not move relative to lower casing 180. This design provides additional strength and minimizes unwanted movement and or adjustment of curved vanes 151, 153. They are shaped to make the distribution of coal particle flow more even and break up coal ropes.

With reference to FIGS. 8-9, it is also possible to direct the fuel/air flow to pass down the fuel feed pipe 38 to minimize erosion and damage to the fuel feed pipe. This shifts the erosion to the curved vanes 151, 153 and the reminder of the head assembly 152.

The curved vanes 151, 153 and the inside of head assembly are covered with a replaceable liner that is highly wear-resistant, such as ceramic or partially metal and partially ceramic. These parts will be described in greater detail in connection with FIG. 10.

The fuel feed pipe 38 is within a fuel compartment 12 that is within the windbox. Therefore, to replace or repair the fuel feed pipe 38, one must disassemble to windbox, then the fuel compartment, then replace or repair the fuel feed pipe 38. This is time-consuming and costly.

On the other hand, the head assembly 152 extends out of the back of the windbox and is easily accessible. In addition, the combustion chamber is on the other side windbox, so the temperatures are significantly lower near the head assembly 152. This requires less time to cool down for servicing.

The embodiment of the present invention also has a removable cover 170. Removal of this cover allows easy access to the parts to be serviced. This makes it even easier to maintain.

Even though 2 curved vanes 154 are shown here, three or more vanes may be used.

Figure 10:
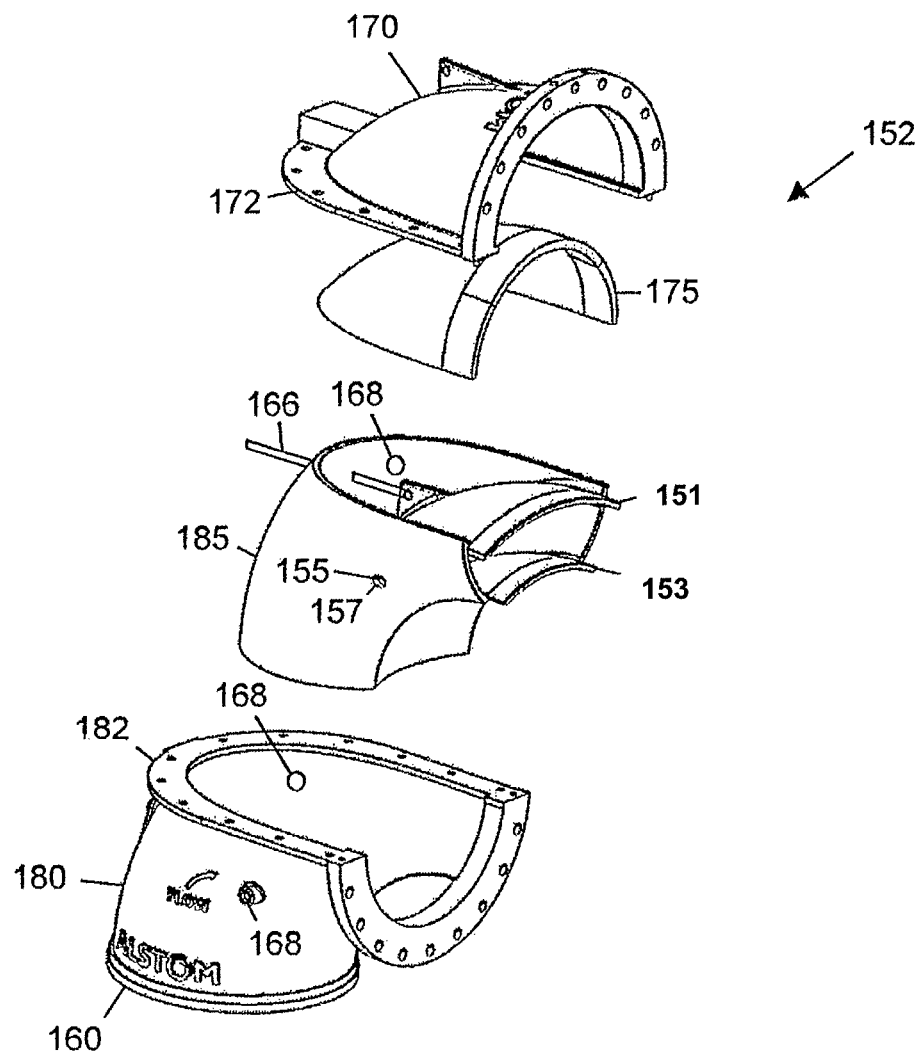
FIG. 10 is an exploded view of the fuel head assembly of FIG. 9 showing internal structures.

FIG. 10 is an exploded view of the fuel head assembly of FIG. 9 showing internal structures. It can now be seen that once the removable cover 170 has been removed, the other parts are easily accessible and replaceable.

There are replaceable internal parts that are highly wear resistant, such as a cover liner 175. This covers the inside surface of the removable cover 170. There also is a casing liner 185 that covers the inside surface of lower casing 180. Curved vanes 151, 153 are made of highly wear resistant materials, and are also removable and replaceable.

One or more inspection ports 168 may be located in the head assembly passing through the casings and the liners to act as inspection ports. Additionally, any of the other features described in connection with FIGS. 3-7 may be employed in this embodiment. The features such as rope breaking vanes, control apparatus and supports may be added.

For reassembly, an upper flange 172 of the removable cover and the lower flange 182 of the lower casing are bolted together to sandwich a gasket (preferably made of tetra-fluouro-ethylene) for a positive seal. Therefore, the present invention provides a device for breaking coal ropes that has removable wear parts, is easily accessible and less costly to maintain.

Figure 11:
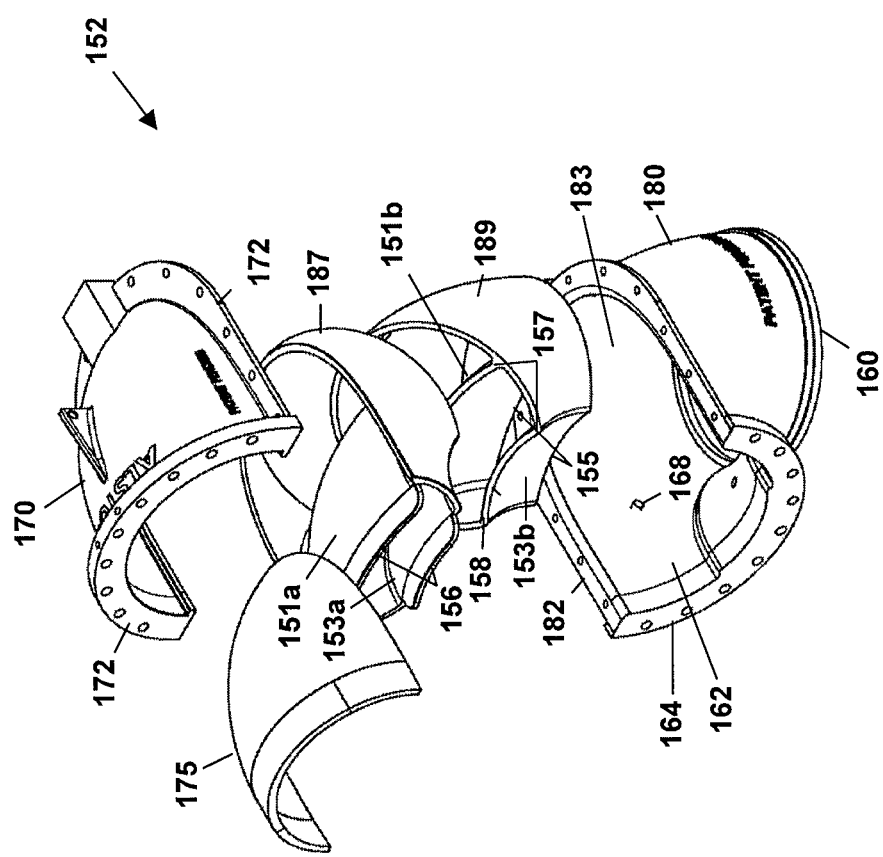
FIG. 11 is an exploded view of another embodiment of the fuel head assembly showing internal structures.

FIG. 11 is an exploded view of another embodiment of the fuel head assembly showing internal structures.

In this embodiment, the wear-resistant removable casing liner (185 of FIG. 10) is made of two parts, an upper casing liner 187 and a lower casing liner 189. Upper casing liner 187 includes an upper section of the first curved vane 151a and the upper section of the second curved vane 153a. The trailing edge 156 of both curved vanes is shown.

Lower casing liner 189 includes a lower section of the first curved vane 151b and lower section of the second curved vane 153b. The leading edge 155 of both curved vanes is shown.

Lower casing liner 189 is inserted into the lower casing 180 first followed by insertion of the upper casing liner 187. The upper section of the first curved vane 151a meets the lower section of the first curved vane 151b to function as a single, continuous curved vane, collectively referred to as 151.

Similarly, the upper section of the second curved vane 153a meets the lower section 151b of the second curved vane 153 to function as a single continuous curved vane, collectively referred to as 153.

The casing liner created in this manner is much easier to install and functions the same.

Figure 12:
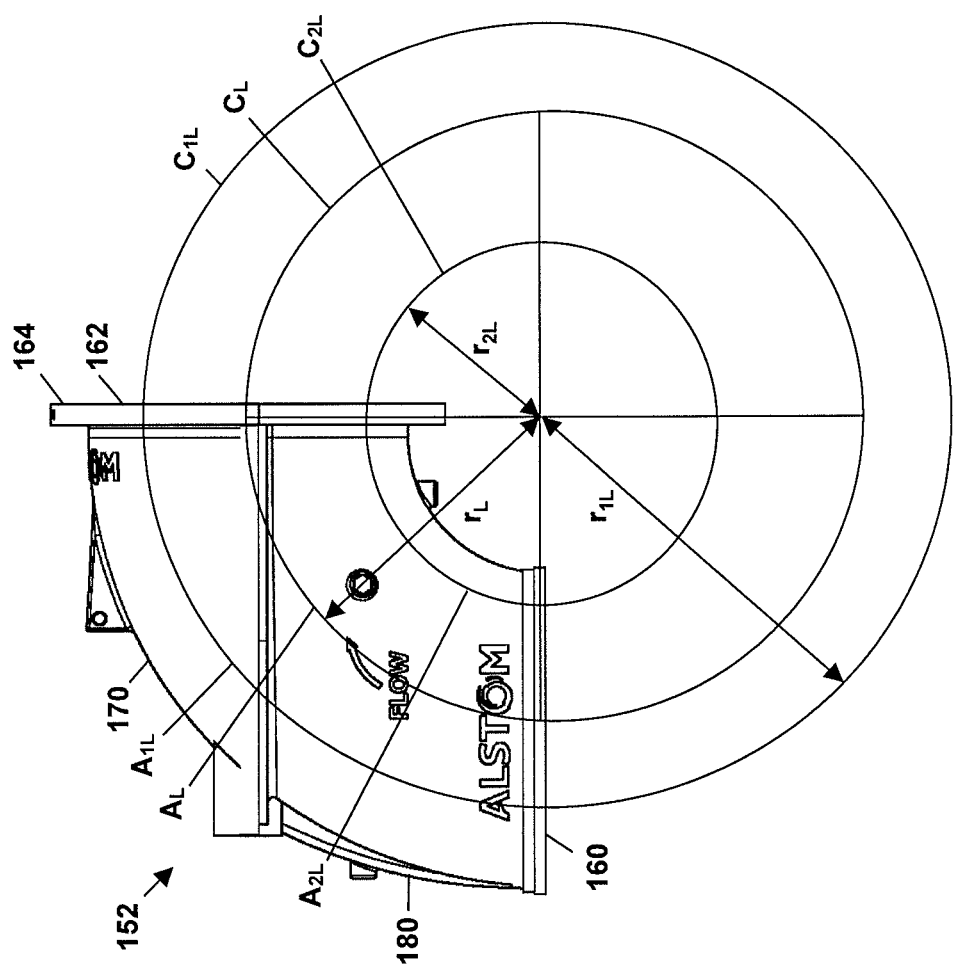
FIG. 12 is a side elevational view of the head assembly according to the present invention, showing the lengthwise curvature of the curved vanes.

FIG. 12 is a side elevational view of the head assembly according to the present invention, showing the lengthwise curvature of the curved vanes.

A curved arc $A_L$ follows the curvature of the centerline of the internal cavity connecting inlet 160 to outlet 162. This spans a 90-degree arc. This arc $A_L$ is continued to create a circle $C_L$ to illustrate its radius of curvature $r_L$.

Arc $A_{1L}$ traces over the internal first curved vane (151 of FIGS. 9-11) not shown in this view. It is extended to create a circle $C_{1L}$ having a radius of curvature $r_{1L}$.

In this case, the curvature of curved vanes is coaxial with the curvature of the head assembly 152. This effectively splits up the flow into sections and directs each section around the curve to break up coal ropes and even the distribution of the airflow and entrained solid fuel particles through the head assembly 152.

In an alternative embodiment, end plates 251, 253, shown in phantom here, may be attached to the trailing edges of the curved vanes. Typical lengths are about 3" long on a 12" diameter conduit. These may direct the airflow by an angle of as much as 13 degrees downward from the direction of arcs $A_{1L}, A_{2L}$ at outlet 162. Since these arcs are 90 degrees arcs, the direction of arcs $A_{1L}, A_{2L}$ at outlet 162 is horizontal.

Figure 13:
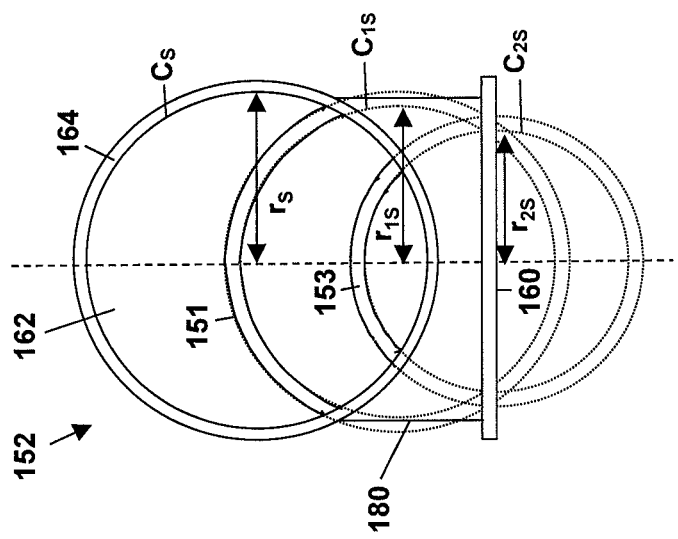
FIG. 13 is a front elevational view of the head assembly according to the present invention, showing the sideways curvature of the curved vanes.

FIG. 13 is a front elevational view of the head assembly according to the present invention, showing the sideways curvature of the curved vanes.

Since the curved vanes 151, 153 curve in two dimensions, we will also define the curvature in the second, or sideways dimension. The inside surface of outlet 162 is circle $C_S$. It has a radius of $r_S$.

The curvature of the first curved vane 151 is extended to create a circle $C_{1S}$ having a radius of curvature in the sideways direction $r_{1S}$. Similarly, the curvature of the second curved vane 153 is extended to create a circle $C_{2S}$ having a radius of curvature in the sideways direction $r_{2S}$.

When $r_{1L}=r_{1S}$, curved vane 151 has the shape of a section of the surface of a sphere. Similarly, when $r_{2L}=r_{2S}$, curved vane 153 has the shape of a section of the surface of a sphere.

It was found that more even airflow resulted from selecting $r_{2S}<r_{1S}<r_S$. This minimized the amount of contact with the outer surfaces. Similarly, it was found that more even airflow resulted from selecting $r_{2L}<r_{2L}<r_L$. This also minimized the amount of contact with the outer surfaces.

It is best of the thickness of the vanes be between 0.25" thick to 1" thick to minimize backpressure. Typical conduit radii would range from 6" to 40".

This design approximates several concentric pipes carrying the flow. However, the present invention has significantly less backpressure compared with concentric pipes.

Some testing was done on the present invention.

Figure 14:
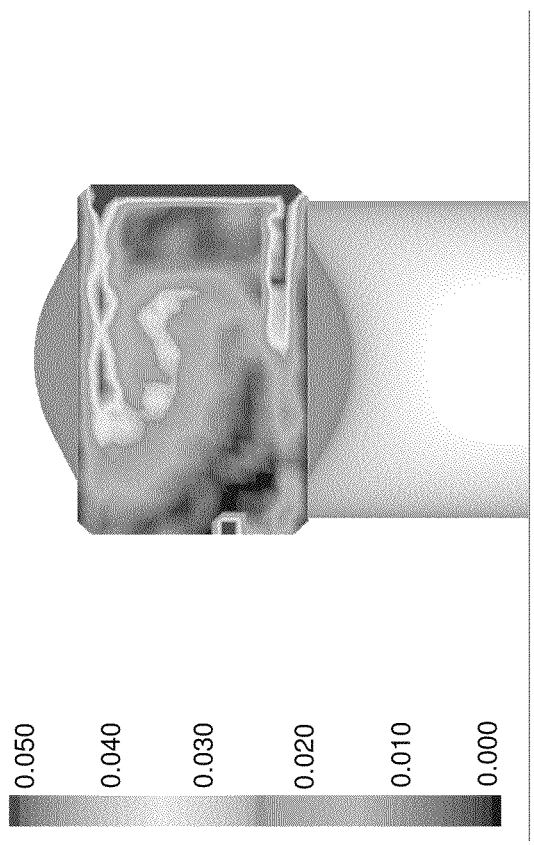
FIG. 14 is a simulation of the concentration contours for pulverized solid fuel particles for a prior art head assembly.

FIG. 14 is a simulation of the concentration contours for pulverized solid fuel particles for a prior art head assembly.

Figure 15:
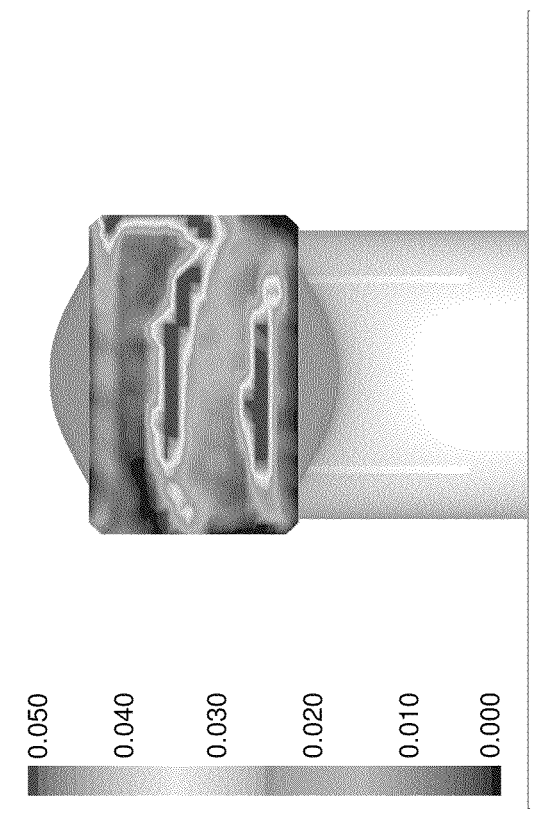
FIG. 15 is a simulation of the concentration contours for pulverized solid fuel particles for the head assembly according to the current invention.

FIG. 15 is a simulation of the concentration contours for pulverized solid fuel particles for the head assembly according to the current invention.

Both FIGS. 14 and 15 show the concentration of solid fuel particles at the output of the nozzle (150 of FIG. 8) measured in pounds per cubic foot. A flow simulation program FLUENT ver. 6.3 was used to produce FIGS. 14 and 15.

As is visible, there is a high concentration of solid particle flow on the right side wall of the prior art nozzle in FIG. 14. It is believed that a high concentration follows the inside top surface of the prior art head assembly. Swirl effects may cause this high concentration to migrate to the right wall as the flow moves from the head assembly to nozzle outlet.

A simulation of the concentration of solid fuel particles of the present invention is shown in FIG. 15. The concentrations overall is more evenly distributed. The highest concentrations are away from the walls in two elongated regions. Each of these regions pertains to a curved vane. The curved vanes are successful in redirecting the flow away from the walls of the nozzle. This minimizes abrasion and corrosion of the walls of the nozzle. The simulation indicated that between the prior art device of FIG. 14 and the present invention of FIG. 15, nozzle erosion is reduced by 95%. This also indicates a part lifespan that is approximately 20 times longer than the prior art part.

Since the concentration is more evenly distributed, it leads to cleaner, more efficient burning of the pulverized solid fuel.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Since the invention is susceptible to various modifications and alternative forms, it should be understood that the invention is not intended to be limited to the particular forms disclosed. Rather, the scope of the invention extends to all modifications, equivalents and alternatives falling within the spirit and scope of the invention as defined by the appended claims.

What is claimed is:

1. A head assembly for a nozzle, the head assembly comprising:
    a lower casing having an opening;
    a removable cover adapted to attach to the lower casing to cover the opening and form an elbow defining an internal cavity and having an input port and output port;
    a wear-resistant casing liner being tubular and disposed within the internal cavity to form a tubular inner wall extending circumferentially about the internal cavity and fluidly coupling the inlet port and the outlet port, the wear-resistant casing liner being insertable into and replaceable through the opening of the lower casing; and
    at least one wear-resistant, replaceable curved vane disposed within the internal cavity for directing a portion of a stream of fluidized particles from the inlet port to the outlet port to reduce contact with the wear-resistant casing liner, the at least one wear-resistant replaceable curved vane having a curved surface with a lengthwise radius of curvature, extending from a leading edge near the inlet port to a trailing edge near the outlet port, and a sideways radius of curvature.

2. The head assembly of claim 1, wherein a portion of the wear resistant casing liner includes a wear-resistant, replaceable cover liner within the removable cover for protecting the removable cover from wear.

3. The head assembly of claim 1 wherein the lengthwise curvature of the curved vane has a radius of curvature approximately equal to the lengthwise radius of curvature of the internal cavity.

4. The head assembly of claim 1, wherein the sideways curvature of the curved vane has a radius of curvature approximately equal to a cross-sectional circumference of the elbow.

5. The head assembly of claim 1, wherein the trailing edge of the at least one wear-resistant, replaceable curved vane is angled between 0 to 13 degrees downward from an adjacent surface of the casing liner.

6. The head assembly of claim 1, wherein the leading edge of the at least one wear-resistant, replaceable curved vane is substantially parallel to an adjacent surface of the casing liner.

7. The head assembly of claim 1, wherein the wear-resistant casing liner includes
    a wear-resistant replaceable upper casing liner and a wear-resistant replaceable lower casing liner that can be inserted separately.

8. The head assembly of claim 7, wherein the at least one wear-resistant, replaceable curved vane includes at least one upper section curved vane integral with and disposed on the upper casing liner, and
    at least one lower section curved vane integral with and disposed on the lower casing liner that meets with the upper section curved vane to function as continuous curved vane.

9. The head assembly of claim 1, wherein the at least one wear-resistant, replaceable curved vane is fixed with respect to said internal cavity to provide additional strength and minimize unwanted movement of the at least one wear-resistant, replaceable curved vane.

10. The head assembly of claim 1 further comprising:
    an aperture passing into internal cavity to allow inspection of the wear-resistant casing liner.

11. The head assembly of claim 1, wherein the at least one wear-resistant curved vane is integral with the wear-resistant casing liner.

12. The head assembly of claim 1 wherein the removable cover and the lower casing form an outlet flange about the outlet port of the elbow.

13. The head assembly of claim 1, wherein the wear-resistant casing liner and the at least one wear-resistant, replaceable curved vane are removable.

14. The head assembly of claim 1, wherein the at least one wear-resistant, replaceable curved vane is fixed to the wear-resistant casing liner.

15. The head assembly of claim 1, further comprising a second wear-resistant, replaceable curved vane disposed within the internal cavity for directing another portion of the stream of fluidized particles from the inlet port to the outlet port to reduce contact with the wear-resistant casing liner, the second wear-resistant replaceable curved vane having a curved surface with a lengthwise radius of curvature, extending from a leading edge near the inlet port to a trailing edge near the outlet port, and a sideways radius of curvature.

16. The head assembly of claim 1, wherein the at least one wear-resistant, replaceable curved vane is insertable and replaceable in-situ.

* * * * *